(12) United States Patent
Setterberg et al.

(10) Patent No.: US 12,240,486 B2
(45) Date of Patent: Mar. 4, 2025

(54) AUTOMATIC ONBOARDING FOR SERVICE RAMP

(71) Applicant: Ningbo Geely Automobile Research & Development Co., Ltd., Ningbo (CN)

(72) Inventors: Johan Setterberg, Gothenburg (SE); Jonathan Johansson, Gothenburg (SE); Erik Lindberg Nilsson, Gothenburg (SE)

(73) Assignee: Ningbo Geely Automobile Research & Development Co., Ningbo (CN)

( * ) Notice: Subject to any disclaimer, the term of this patent is extended or adjusted under 35 U.S.C. 154(b) by 399 days.

(21) Appl. No.: 17/511,402

(22) Filed: Oct. 26, 2021

(65) Prior Publication Data
US 2022/0048534 A1 Feb. 17, 2022

Related U.S. Application Data

(63) Continuation of application No. PCT/CN2020/085344, filed on Apr. 17, 2020.

(30) Foreign Application Priority Data

May 3, 2019 (EP) .................................... 19172532

(51) Int. Cl.
*B60W 60/00* (2020.01)

(52) U.S. Cl.
CPC ....... *B60W 60/001* (2020.02); *B60W 2420/42* (2013.01); *B60W 2420/52* (2013.01); *B60W 2554/4041* (2020.02)

(58) Field of Classification Search
CPC .......... B60W 60/001; B60W 2420/42; B60W 2420/52; B60W 2554/4041;
(Continued)

(56) References Cited

U.S. PATENT DOCUMENTS 3,509,527 A * 4/1970 Oakes ................. G08G 1/0962
340/940
6,324,994 B1 * 12/2001 Glenn ..................... B62M 6/75
105/72.2
(Continued)

FOREIGN PATENT DOCUMENTS

CN 105911994 A 8/2016
CN 107270915 A * 10/2017
(Continued)

OTHER PUBLICATIONS

International Search Report from corresponding International Application No. PCT/CN2020/085344, dated Jul. 15, 2020, 2 pages.

*Primary Examiner* — Donald J Wallace
(74) *Attorney, Agent, or Firm* — Tucker Ellis LLP

(57) ABSTRACT

A vehicle includes a system for autonomously onboarding the vehicle onto a ramp with one or more ramp paths. The system has sensors positioned in front of the front wheels of the vehicle that obtain a three dimensional view of at least an area in front of the wheels. The system also has a control unit configured to receive the three dimensional view from the sensors, identify the one or more ramp paths of the ramp in the three dimensional view, calculate a three dimensional path for onboarding the vehicle on the one or more ramp paths of the ramp and control the vehicle to autonomously onboard the vehicle on to the one or more ramp paths of the ramp along the three dimensional path.

13 Claims, 2 Drawing Sheets

(58) Field of Classification Search
CPC ......... B60W 2422/00; B60W 2552/00; B60W 2552/15; B60W 60/0011; G05D 2201/0213; G05D 1/0253; G05D 1/0225
See application file for complete search history.

(56) References Cited

U.S. PATENT DOCUMENTS

| | | | | |
|---|---|---|---|---|
| 8,208,021 | B2 * | 6/2012 | Unoura | G06T 7/12 |
| | | | | 348/148 |
| 10,556,780 | B2 * | 2/2020 | Zecher | B66F 7/28 |
| 2003/0080877 | A1 * | 5/2003 | Takagi | B62D 15/0275 |
| | | | | 348/E7.086 |
| 2009/0102921 | A1 * | 4/2009 | Ito | H04N 7/181 |
| | | | | 348/148 |
| 2009/0143967 | A1 * | 6/2009 | Lee | B60R 1/00 |
| | | | | 701/119 |
| 2011/0199232 | A1 * | 8/2011 | Healy | B66F 7/28 |
| | | | | 345/473 |
| 2013/0103274 | A1 * | 4/2013 | Binder | G01N 21/41 |
| | | | | 701/1 |
| 2013/0169469 | A1 * | 7/2013 | Mitsuta | G01S 13/931 |
| | | | | 348/148 |
| 2016/0347323 | A1 | 12/2016 | Yoshitomi | |
| 2017/0247033 | A1 | 8/2017 | Vandapel | |
| 2017/0336794 | A1 * | 11/2017 | Shashua | B60W 60/00 |
| 2019/0004526 | A1 | 1/2019 | Soliman | |
| 2019/0120946 | A1 * | 4/2019 | Wheeler | G01S 17/89 |
| 2019/0168751 | A1 * | 6/2019 | Iyengar | G01C 21/34 |
| 2022/0097473 | A1 * | 3/2022 | Kasuya | B60G 17/0182 |

FOREIGN PATENT DOCUMENTS

| | | |
|---|---|---|
| DE | 102012017932 A1 | 3/2013 |
| GB | 2471276 A | 12/2010 |

* cited by examiner

AUTOMATIC ONBOARDING FOR SERVICE RAMP

RELATED APPLICATION DATA

This application is a continuation of International Patent Application No. PCT/CN2020/085344, filed Apr. 17, 2020, which claims the benefit of European Patent Application No. 19172532.4, filed May 3, 2019, the disclosures of which are incorporated herein by reference in their entireties.

TECHNICAL FIELD

The present invention relates to a vehicle and a method for autonomously onboarding of the vehicle on a ramp.

BACKGROUND

For some users of a vehicle, it is hard or they feel uncomfortable to drive up on and onboard the vehicle on a ramp. The user thus tends to avoid to drive onto ramps in places such as automatic car washes, boat ferries, service pits, etc.

SUMMARY

It is an object to mitigate, alleviate or eliminate one or more of the above-identified deficiencies in the art and disadvantages singly or in any combination and solve at least the above mentioned problem.

According to a first aspect there is provided a vehicle comprising a system for autonomously onboarding of the vehicle on a ramp comprising one or more ramp paths, wherein the vehicle comprises at least a first and a second front wheel and at least a first and a second rear wheel and the system comprises: —a first sensor positioned in front of the first front wheel, —a second sensor positioned in front of the second front wheel, —the first and second sensors are configured to obtain a three dimensional view of at least an area in front of the first and the second front wheel, —a control unit configured to receive the three dimensional view from the first and second sensors, identify the one or more ramp paths of the ramp in the three dimensional view, calculate a three dimensional path for onboarding the vehicle on the one or more ramp paths of the ramp and to control the vehicle to autonomously onboard the vehicle on to the one or more ramp paths of the ramp along the three dimensional path.

By the system the vehicle could be onboarded onto a ramp even if the user of the vehicle is uncomfortable and afraid of driving onto the ramp. This will open up new possibilities for users that earlier have been limited from washing the vehicle in a car wash or driving onto a ramp of a boat.

According to some embodiments, the control unit is further configured to identify and to calculate the three dimensional path at least based on one or more of the width, elevation, height, direction, start and end of each of the one or more paths of the ramp. This will make the calculation of the three dimensional ramp path even more accurate.

According to some embodiments, wherein the three dimensional path for onboarding the vehicle on the one or more ramp paths of the ramp comprises a separate three dimensional path for each of the first front wheel and the second front wheel. An advantage of this is that the control unit easier could onboard the vehicle on ramps that is uneven in the width or that is curved in some way.

According to some embodiments, wherein the three dimensional path for onboarding the vehicle on the one or more ramp paths of the ramp comprises a separate three dimensional path for each of the first rear wheel and the second rear wheel. This makes it easier to onboard the vehicle on an uneven ramp.

According to some embodiments, the first and the second sensors are positioned under the vehicle that makes it easier to detect the ramp in front of the wheels and to adjust the paths if there are any changes.

According to some embodiments, the area at least comprises an area under the vehicle in front of the first and the second front wheels. This makes it easier to detect the ramp in front of the wheels and to adjust the paths if there are any changes.

According to some embodiments, the control unit is configured to continuously update the three dimensional path based on continuously received input from the first and second sensors. This makes it easier for the control unit to correct for any changes in the position of the vehicle on the ramp if the wheels has slid sideways, spun or skidded.

According to some embodiments, the first and the second sensors are a camera, a radar and/or an infrared sensor.

According to some embodiments, the first and the second sensors are configured to obtain the three dimensional view of at least the area in front of the first and second front wheel by obtaining several images as the vehicle is moving. By this different types of sensors could be used to obtain a three dimensional view and that even is used for other purposes on the vehicle. For instance a sensor configured to obtain a two dimensional view or image could be used to obtain the three dimensional view.

According to some embodiments, the system comprises a fifth sensor connected to the control unit and configured to detect a signal indicative of a request to initiate an onboarding to the ramp. This is an efficient way of identifying when it is OK to onboard the ramp and when it is not OK to onboard the ramp, i.e. when the vehicle should be stopped.

According to some embodiments, the first or second sensors are moveable to obtain a view of the area from different angles to obtain the three dimensional view. By this, a two dimensional type of sensors could be used that is cheaper and still obtain a three dimensional view.

According to some embodiments, the control unit is configured to identify a left ramp path and a right ramp path of the ramp in the received input and to control the first front wheel and the first rear wheel of the vehicle to autonomously onboard the left ramp path of the ramp and the second front wheel and the second rear wheel of the vehicle to autonomously onboard the right ramp path of the ramp.

According to a second aspect there is provided a method for autonomously onboarding of the vehicle according to the first aspect on a ramp, comprising the steps of: —obtaining, by the first and second sensors a three dimensional view of at least an area in front of the first and second front wheel, —receiving, in the control unit the three dimensional view from the first and second sensors, —identifying the one or more ramp paths of the ramp in the three dimensional view, —calculating a three dimensional path for onboarding the vehicle on the one or more ramp paths of the ramp, —controlling the vehicle to autonomously onboard the vehicle on to the one or more ramp paths of the ramp along the three dimensional path.

By the system the vehicle could be onboarded onto a ramp even if the user of the vehicle is uncomfortable and afraid of driving into the ramp. This will open up new possibilities for users that earlier have been limited from washing the vehicle in a car wash or driving onto a ramp of a boat.

Effects and features of the second aspect are to a large extent analogous to those described above in connection with the first aspect. Embodiments mentioned in relation to the first aspect are largely compatible with the second aspect.

A further scope of applicability of the present invention will become apparent from the detailed description given below. However, it should be understood that the detailed description and specific examples, while indicating preferred embodiments of the invention, are given by way of illustration only. Various changes and modifications within the scope of the invention will become apparent to those skilled in the art from the detailed description.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

The term a three dimensional view of at least an area is to be interpreted as a view of the volume at the area or above the area. In some embodiments, any of the above aspects may additionally have features identical with or corresponding to any of the various features as explained above for any of the other aspects.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

The present invention will now be described with reference to the accompanying drawings, in which currently preferred example embodiments of the invention are shown.

This invention may, however, be embodied in many different forms and should not be construed as limited to the herein disclosed embodiments. The disclosed embodiments are provided to fully convey the scope of the invention to the skilled person.

Figure 1:
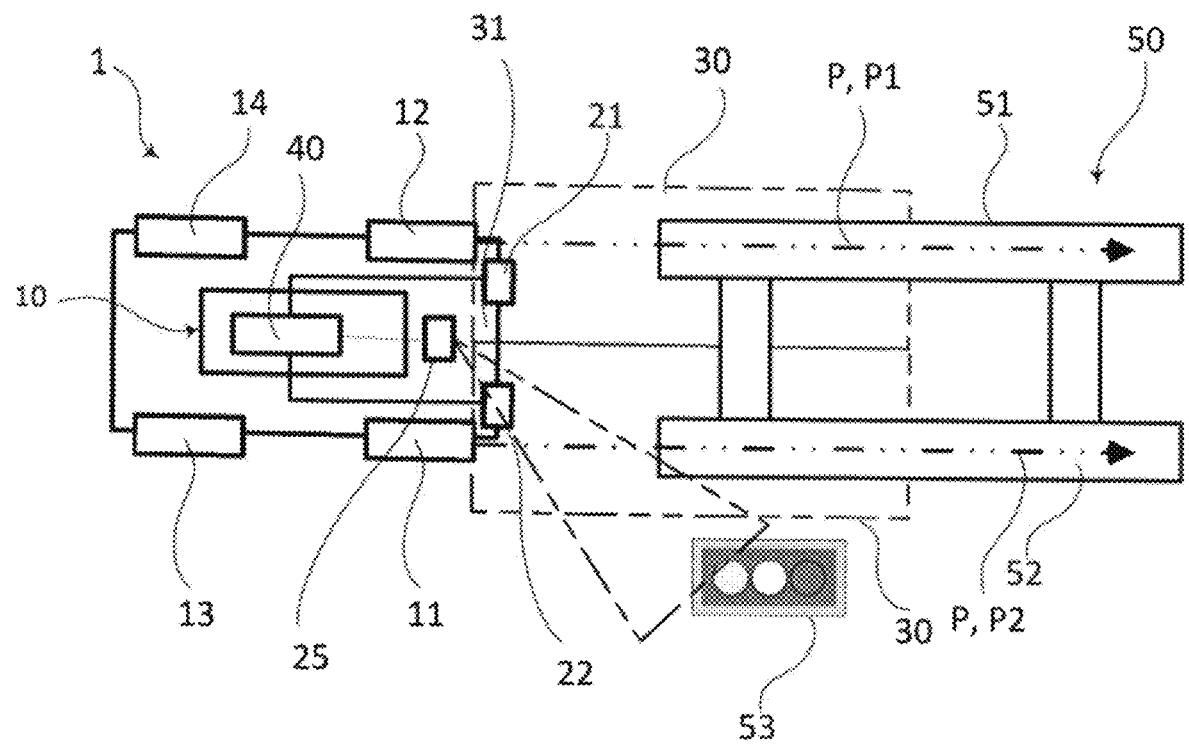
FIG. 1 is a schematic view from above of a vehicle and a ramp according to an aspect.
Figure 2:
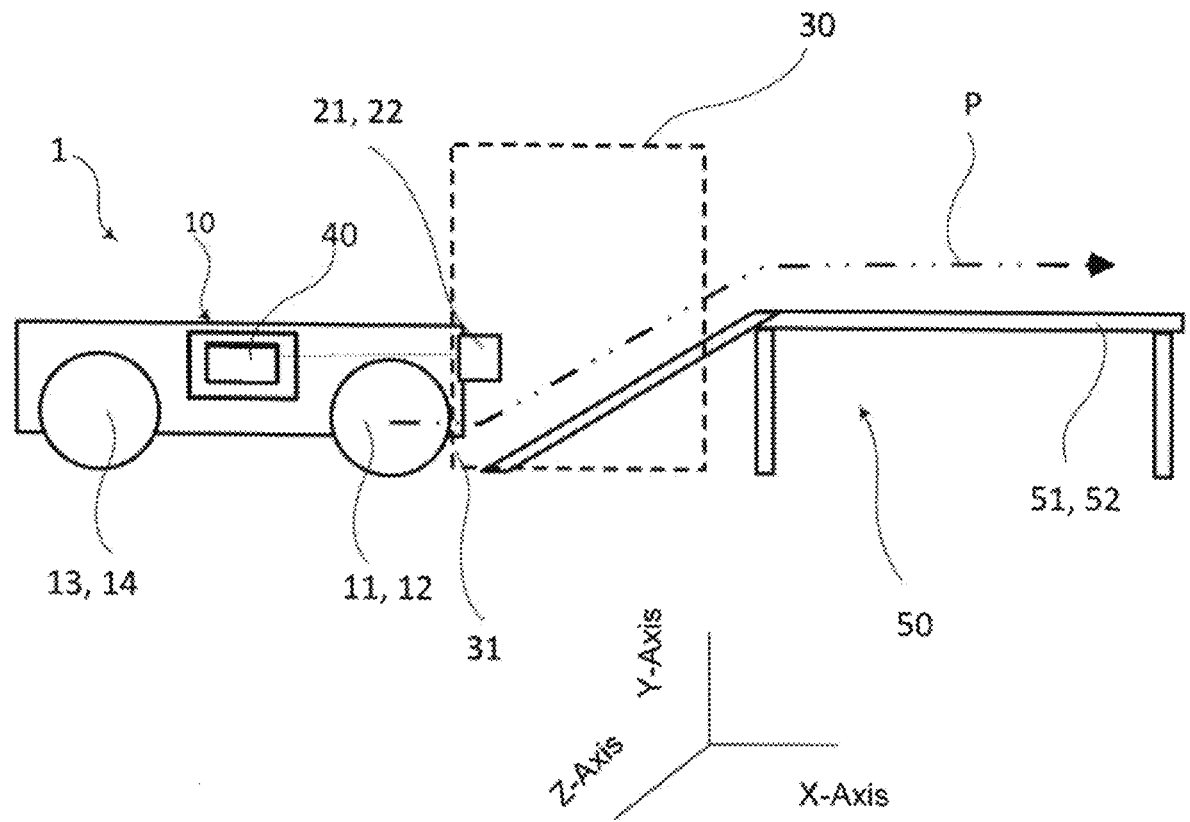
FIG. 2 is a schematic side view of a vehicle and a ramp according to an aspect.

FIG. 1 and FIG. 2 shows a ramp 50 and a vehicle 1 that should drive up onto the ramp 50.

The ramp 50 comprises one or more ramp paths 51, 52. According to an aspect the ramp comprises a left ramp path 51 and a right ramp path 52. According to an aspect the ramp comprises signal lights 53 that is configured to indicate when the vehicle 1 is allowed to onboard the ramp 50. According to an aspect the ramp 50 is a ramp 50 of a car wash, a boat ferry, transporting train, transporting truck or a service pit. The left and right paths 51, 52 have a width that is larger than the width of a wheel that should drive upon the left or right ramp paths 51, 52. The one or more ramp paths 51, 52 are according to an aspect parallel to each other. The one or more ramp paths 51, 52 comprise according to an aspect one or more inclined parts, as is seen in FIG. 2. The one or more ramp paths 51, 52 comprise according to an aspect one or more curved parts. According to an aspect the one or more inclined parts of the one or more ramp paths 51, 52 are inclined in relation to the ground below the ramp 50. It could either be that the ramp paths 51, 52 are inclined and the ground is straight, that the ramp paths 51. 52 are straight and the ground is inclined or that both the ground and the ramp paths 51, 52 are inclined.

The vehicle 1 comprises at least a first and a second front wheel 11, 12 and at least a first and a second rear wheel 13, 14. The vehicle 1 is according to an aspect one of a car, a bus or a truck. According to an aspect the vehicle 1 is an autonomous driving vehicle 1. The vehicle 1 further comprises a system 10. The system 10 is configured to autonomously onboarding the vehicle 1 onto the ramp 50. The system 10 comprises a first sensor 21, a second sensor 22, and a control unit 40. According to an aspect the system 10 further comprises a fifth sensor 25.

The first sensor 21 is positioned in front of the first front wheel 11. The second sensor 22 is positioned in front of the second front wheel 12. The first and second sensors 21, 22 are configured to obtain a three dimensional view of at least an area 30 in front of the first and the second front wheel 11, 12. By three dimensional view of the area 30 is meant that the first and second sensors 21, 22 are configured to obtain a view of a volume at the area 30 in front of the first and the second front wheel 11, 12. According to an aspect the first sensor 21 is configured to obtain a three dimensional view of at least an area 30 in front of the first front wheel 11. According to an aspect the second sensor 22 is configured to obtain a three dimensional view of at least an area 30 in front of the second front wheel 12.

The control unit 40 is connected to the first and second sensors 21, 22. The control unit is configured to receive the three dimensional view from the first and second sensors 21, 22. The control unit 40 is configured to identify the ramp 50 in the three dimensional view. The control unit 40 is configured to identify the one or more ramp paths 51, 52 of the ramp 50 in the three dimensional view. The control unit 40 is configured to calculate a three dimensional path P for onboarding the vehicle on the one or more ramp paths 51, 52 of the ramp 50. The control unit 40 is configured to control the vehicle 1 to autonomously onboard the vehicle 1 on to the one or more ramp paths 51, 52 of the ramp 50 along the three dimensional path P. The three dimensional path P is based on how the first and second front wheels 11, 12 and the first and second rear wheels 13, 14 of the vehicle 1 should be moved to onboard the vehicle 1 onto the ramp 50. The three dimensional path P comprises information of three dimensional positions of different points along the path, i.e. definitions of the positions in the x, y, z scale as disclosed in FIG. 2.

The first aspect of this disclosure shows the vehicle 1 comprising the system 10 for autonomously onboarding of the vehicle 1 on the ramp 50.

By three dimensional path P is meant a path P that comprises information in three dimensions of how the vehicle 1 should move. According to an aspect the three dimensional path P comprises information of how the vehicle 1 should be moved forward, sideways and height ways to onboard the ramp 50. If for instance the ramp 50 is flat, the height of the three dimensional path P is constant. Put in another way, the three dimensional path P could be constant in one or more directions.

By autonomously onboard the vehicle 1 is meant that the control unit 40 at least controls a steering of the vehicle 1 such that it controls the direction that the vehicle 1 is moved in and that is onboarded to the ramp 50. According to an aspect autonomously onboard the vehicle 1 comprises that the control unit 40 controls the steering and the speed of the vehicle 1 such that it is on boarded onto the ramp 50. The control unit 40 controls the steering of the vehicle 1 by controlling the angle of the first and second front wheels 11, 12. According to an aspect the vehicle 1 is on boarded onto the ramp 50 by moving the vehicle 1 forward. According to an aspect the vehicle 1 is on boarded onto the ramp 50 by reversing the vehicle 1.

According to an aspect the control unit 40 is further configured to identify and to calculate the three dimensional path P at least based on one or more of the width, elevation, height, direction, start and end of each of the one or more paths 51, 52 of the ramp 50.

Figure 3:
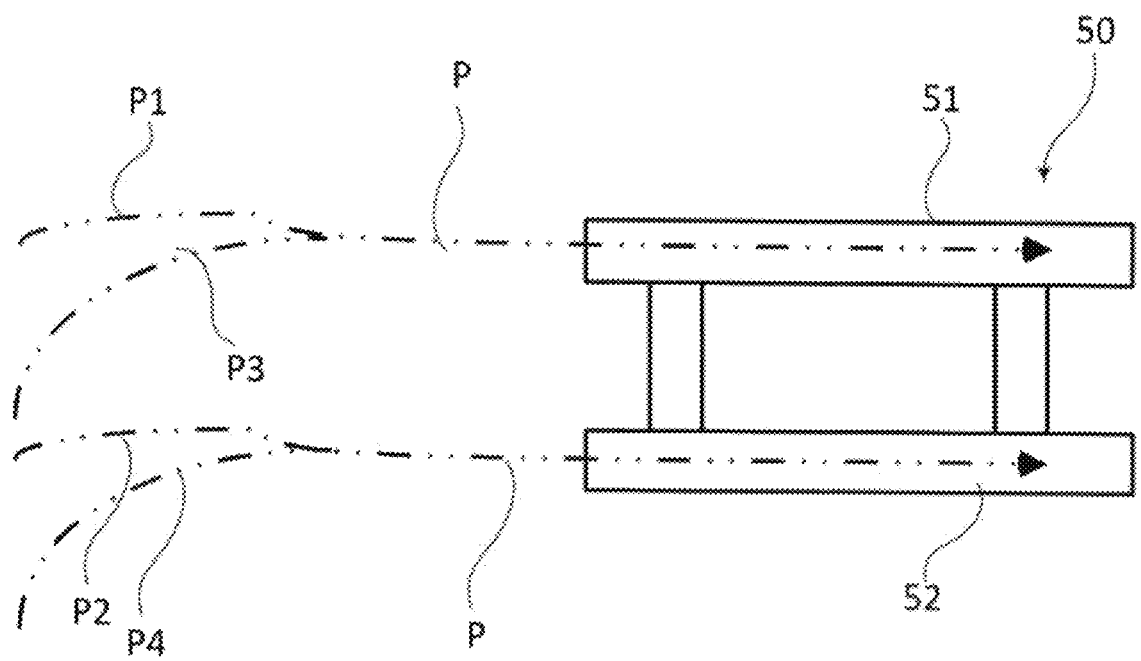
FIG. 3 is a schematic view from above of the onboarding path and a ramp according to an aspect.

According to an aspect the three dimensional path P for onboarding the vehicle 1 on the one or more ramp paths 51, 52 of the ramp 51 comprises a separate three dimensional path P1,P2 for each of the first front wheel 11 and the second front wheel 12, as is disclosed in FIG. 1-3.

According to an aspect the three dimensional path P for onboarding the vehicle 1 on the one or more ramp paths 51, 52 of the ramp 51 comprises a separate three dimensional path P3,P4 for each of the first rear wheel 13 and the second rear wheel 14, as is disclosed in FIG. 3.

According to an aspect the first and the second sensors 21, 22 are positioned under the vehicle 1. According to an aspect the area 30 at least comprises an area 31 under the vehicle 1 in front of the first and the second front wheels 11, 12 as is disclosed in FIGS. 1 and 2.

According to an aspect the control unit 40 is configured to continuously update the three dimensional path P based on continuously received input from the first and second sensors 21, 22.

According to an aspect the first and the second sensors 21, 22 are a camera, a radar and/or an infrared sensor. According to an aspect the first and the second sensors 21, 22 are configured to the obtain the three dimensional view of at least the area 30 in front of the first and second front wheel 11, 12 by obtaining several images as the vehicle 1 is moving. By obtaining images as the vehicle 1 is moving a three dimensional view could be obtained by analyzing two dimensional images. This will reduce the costs of the sensors. By obtaining images is meant obtaining an image by the camera, the radar and/or the infrared sensor.

According to an aspect the fifth sensor 25 is connected to the control unit 40 and configured to detect a signal indicative of a request to initiate an onboarding to the ramp 50. The signal could be a light signal from the signal lights 53.

According to an aspect the control unit 40 comprise, or have access to, information regarding the vehicle 1 such as the width of the tires, the distance between the first and second front wheels 11, 12, the distance between the first and second rear wheels 13, 14, the distance between the first front wheel 11 and the first rear wheel 13 and the distance between the second front wheel 12 and the second rear wheel 14. According to an aspect the calculating of the three dimensional path P is further based on one or more of the above information of the vehicle 1.

According to an aspect the first and second sensors 11, 12 are moveable to obtain a view of the area 30 from different angles to obtain the three dimensional view. According to an aspect the first sensor 11 is moveable to obtain a view of the area 30 from different angles to obtain the three dimensional view. According to an aspect the second sensor 12 is moveable to obtain a view of the area 30 from different angles to obtain the three dimensional view.

According to an aspect the control unit 40 is configured to identify a left ramp path 51 and a right ramp path 52 of the ramp 50 in the received input and to control the first front wheel 11 and the first rear wheel 13 of the vehicle 1 to autonomously onboard the left ramp path 51 of the ramp 50 and the second front wheel 12 and the second rear wheel 14 of the vehicle 1 to autonomously onboard the right ramp path 52 of the ramp 50.

According to an aspect the control unit 40 calculates the three dimensional paths P3, P4 for onboarding the first and second rear wheels 13, 14 based on a relative position between the first and second front wheels 11, 12 and the first and second rear wheels 13, 14.

According to an aspect the system 10 further comprises a third sensor positioned in front of the first rear wheel 13 and a fourth sensor positioned in front of the second rear wheel 14. The control unit 40 is configured to calculate the three dimensional path P for onboarding the vehicle 1 on the one or more ramp paths 51, 52 of the ramp 50 also based on input from the third and fourth sensors. According to an aspect the third and the fourth sensors are positioned under the vehicle 1.

According to an aspect the three dimensional path P for onboarding the vehicle 1 on the ramp 50 is continuously updated by the control unit 40 as the vehicle 1 is moved, i.e. autonomously driven, along the three dimensional path P. By constantly updating the three dimensional path P any sliding of any of the wheels 11, 12, 13, 14 could be compensated for.

The second aspect of this disclosure shows a method 100 for autonomously onboarding of the vehicle 1 according to the first aspect on a ramp 50. The method comprise the steps of: —obtaining S1, by the first and second sensors 21, 22 a three dimensional view of at least an area 30 in front of the first and second front wheel 11, 12, —receiving S2, in the control unit 40 the three dimensional view from the first and second sensors 21, 22, —identifying S3 the one or more ramp paths 51, 52 of the ramp 50 in the three dimensional view, —calculating S4 a three dimensional path P for onboarding the vehicle on the one or more ramp paths 51, 52 of the ramp, —controlling S5 the vehicle 1 to autonomously onboard the vehicle 1 on to the one or more ramp paths 51, 52 of the ramp 50 along the three dimensional path P.

Hereafter will an example of onboarding the vehicle 1 onto the ramp be described. If for instance a user of the vehicle 1 should visit a service workshop for servicing the vehicle 1 or to wash the vehicle 1 in a car wash comprising the ramp 50, the vehicle 1 drives towards the ramp 50. This could be done by the user of the vehicle 1 or autonomously by the vehicle 1. When the vehicle 1 approaches the ramp 50, the first and second sensors 21, 22 detects the ramp 50 and its one or more ramp paths 51, 52. The first and second sensors 21, 22 obtains a three dimensional view of the area 30 in front of the vehicle 1. The three dimensional view of the area 30 comprises information of one or more of the width, elevation, height, direction, start and end of each of the one or more paths 51, 52 of the ramp 50. The first and second sensors 21, 22 send the information to the control unit 40. The control unit 40 receives the three dimensional view from the first and second sensors 21, 22. The three dimensional view is analyzed in the control unit 40 and any ramp 50 is detected in the three dimensional view. When the ramp 50 is detected it is also analyzed if the ramp 50 comprises one or more ramp paths 51, 52 and each ramp path 51 52 of the ramp 50 is detected in the three dimensional view by the control unit 40. The control unit 40 detects the left ramp path 51 and the right ramp path 52. The control unit 40 detects one or more of the width, elevation, height, direction, start and end of each of the one or more paths 51, 52 of the ramp 50.

The control unit 40 thereafter calculates the three dimensional path P for onboarding the vehicle 1 on the ramp 50. The path P comprises the three dimensional path P1 for the onboarding the first front wheel 11 onto the left ramp path 51 and the three dimensional path P2 for onboarding the second front wheel 12 onto the right ramp path 52. The path P further comprises the three dimensional path P3 for the onboarding the first rear wheel 13 onto the left ramp path 51 and the three dimensional path P4 for onboarding the second rear wheel 14 onto the right ramp path 52.

The fifth sensor 25 detects the signal light 53. The fifth sensor 53 obtains information of the signal light 53 and sends it to the control unit 40. The control unit 40 receives the information from the fifth sensor 53 and detects if the signal light 53 indicates it is OK to onboard the ramp 50 or if the vehicle 1 should wait.

When a signal indicative of that it is OK to onboard the vehicle 1 onto the ramp 50 is detected by the control unit 40, the autonomously onboarding could be initiated. The autonomously onboarding could be initiated automatically when the signal indicative of that it is OK is detected. According to an aspect the autonomously onboarding is initiated when the signal indicative of that it is OK is detected and that the control unit 40 receives input from the user of that the vehicle 1 should onboard the ramp 50. The control unit 40 controlling the vehicle 1 to autonomously onboard the vehicle 1 on to the ramp 50 along the three dimensional path P. The control unit 40 controls the angles of the first and second front wheels 11, 12 and the speed of the vehicle 1 such that is moves along the three dimensional path P. The control unit 40 controls the angle of the first front wheel 11 to onboard the left ramp path 51 and the angle of the second front wheel 12 to onboard the right ramp path 52. When the vehicle 1 reaches the end of the three dimensional path P it is onboarded onto the ramp 50 and the vehicle 1 is stopped. The vehicle 1 is now onboarded on the ramp 50.

According to an aspect the control unit 40 is further configured to offboard the vehicle 1 from the ramp 50 based on an inverse of the three dimensional path P for onboarding the vehicle 1.

Figure 4:
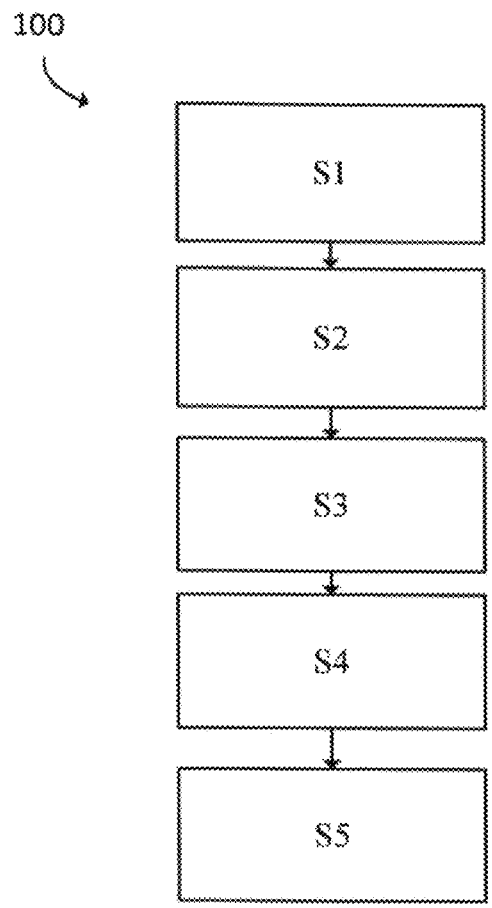
FIG. 4 is a flowchart illustrating example method steps according to some embodiments and aspect.

According to some embodiments, a computer program product comprises a computer readable medium such as, for example a universal serial bus (USB) memory, a plug-in card, an embedded drive or a read only memory (ROM). An example computer readable medium could be a compact disc (CD) ROM. The computer readable medium has stored thereon a computer program comprising program instructions for performing the method according to the above. The computer program is loadable into a data processor (PROC), which may, for example, be comprised in the control unit 40 or vehicle 1. When loaded into the data processing unit, the computer program may be stored in a memory associated with or comprised in the data-processing unit. According to an aspect, the computer program may, when loaded into and run by the data processing unit, cause execution of method steps according to, for example, any of the methods illustrated in FIG. 4 or otherwise described herein.

The person skilled in the art realizes that the present invention is not limited to the preferred embodiments described above. The person skilled in the art further realizes that modifications and variations are possible within the scope of the appended claims. Additionally, variations to the disclosed embodiments can be understood and effected by the skilled person in practicing the claimed invention, from a study of the drawings, the disclosure, and the appended claims.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and aspect and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a vehicle.

Embodiments and aspects may appear within an electronic apparatus (associated with or comprised in a vehicle) comprising arrangements, circuitry, and/or logic according to any of the embodiments described herein. Alternatively or additionally, an electronic apparatus (associated with or comprised in a vehicle) may be configured to perform methods according to any of the embodiments described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments and aspect, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. A vehicle comprising a system for autonomously onboarding of the vehicle on a ramp comprising one or more ramp paths, wherein the vehicle comprises at least a first and a second front wheel and at least a first and a second rear wheel and the system comprises:
    a first sensor positioned in front of the first front wheel,
    a second sensor positioned in front of the second front wheel,
    the first and second sensors are configured to obtain a three dimensional view of at least an area in front of the first and the second front wheel, wherein the area at least comprises an area under the vehicle in front of the first and the second front wheels,
    a control unit configured to receive the three dimensional view from the first and second sensors, identify the one or more ramp paths of the ramp in the three dimensional view, calculate a three dimensional path for onboarding the vehicle on the one or more ramp paths of the ramp and to control the vehicle to autonomously onboard the vehicle on to the one or more ramp paths of the ramp along the three dimensional path.

2. The vehicle according to claim 1, wherein the control unit is further configured to identify and to calculate the three dimensional path at least based on one or more of the width, elevation, height, direction, start and end of each of the one or more ramp paths of the ramp.

3. The vehicle according to claim 1, wherein the three dimensional path for onboarding the vehicle on the one or more ramp paths of the ramp comprises a separate three dimensional path for each of the first front wheel and the second front wheel.

4. The vehicle according to claim 1, wherein the three dimensional path for onboarding the vehicle on the one or more ramp paths of the ramp comprises a separate three dimensional path for each of the first rear wheel and the second rear wheel.

5. The vehicle according to claim 1, wherein the first and the second sensors are positioned under the vehicle.

6. The vehicle according to claim 1, wherein the control unit is configured to continuously update the three dimensional path based on continuously received input from the first and second sensors.

7. The vehicle according to claim 1, wherein the first and the second sensors are a camera, a radar and/or an infrared sensor.

8. The vehicle according to claim 7, wherein the first and the second sensors are configured to the obtain the three dimensional view of at least the area in front of the first and second front wheel by obtaining several images as the vehicle is moving.

9. The vehicle according to claim 1, wherein the system comprises a fifth sensor connected to the control unit and configured to detect a signal indicative of a request to initiate an onboarding to the ramp.

10. The vehicle according to claim 1, wherein the first or second sensors are moveable to obtain a view of the area from different angles to obtain the three dimensional view.

11. The vehicle according to claim 1, wherein the control unit is configured to identify a left ramp path and a right ramp path of the ramp in the received input and to control the first front wheel and the first rear wheel of the vehicle to autonomously onboard the left ramp path of the ramp and the second front wheel and the second rear wheel of the vehicle to autonomously onboard the right ramp path of the ramp.

12. A method for autonomously onboarding of the vehicle according to claim 1 on a ramp, comprising the steps of:
    obtaining, by the first and second sensors a three dimensional view of at least an area in front of the first and second front wheel,
    receiving, in the control unit the three dimensional view from the first and second sensors,
    identifying the one or more ramp paths of the ramp in the three dimensional view,
    calculating a three dimensional path for onboarding the vehicle on the one or more ramp paths of the ramp,
    controlling the vehicle to autonomously onboard the vehicle on to the one or more ramp paths of the ramp along the three dimensional path.

13. The vehicle according to claim 1, wherein obtaining the three dimensional view comprises obtaining measurements of the width, elevation, height, direction, start and end of each of the one or more ramp paths of the ramp.

* * * * *